May 9, 1950 E. P. PALMATIER 2,507,044
DEICING SYSTEM FOR AIRCRAFT
Filed Sept. 20, 1943 4 Sheets-Sheet 1
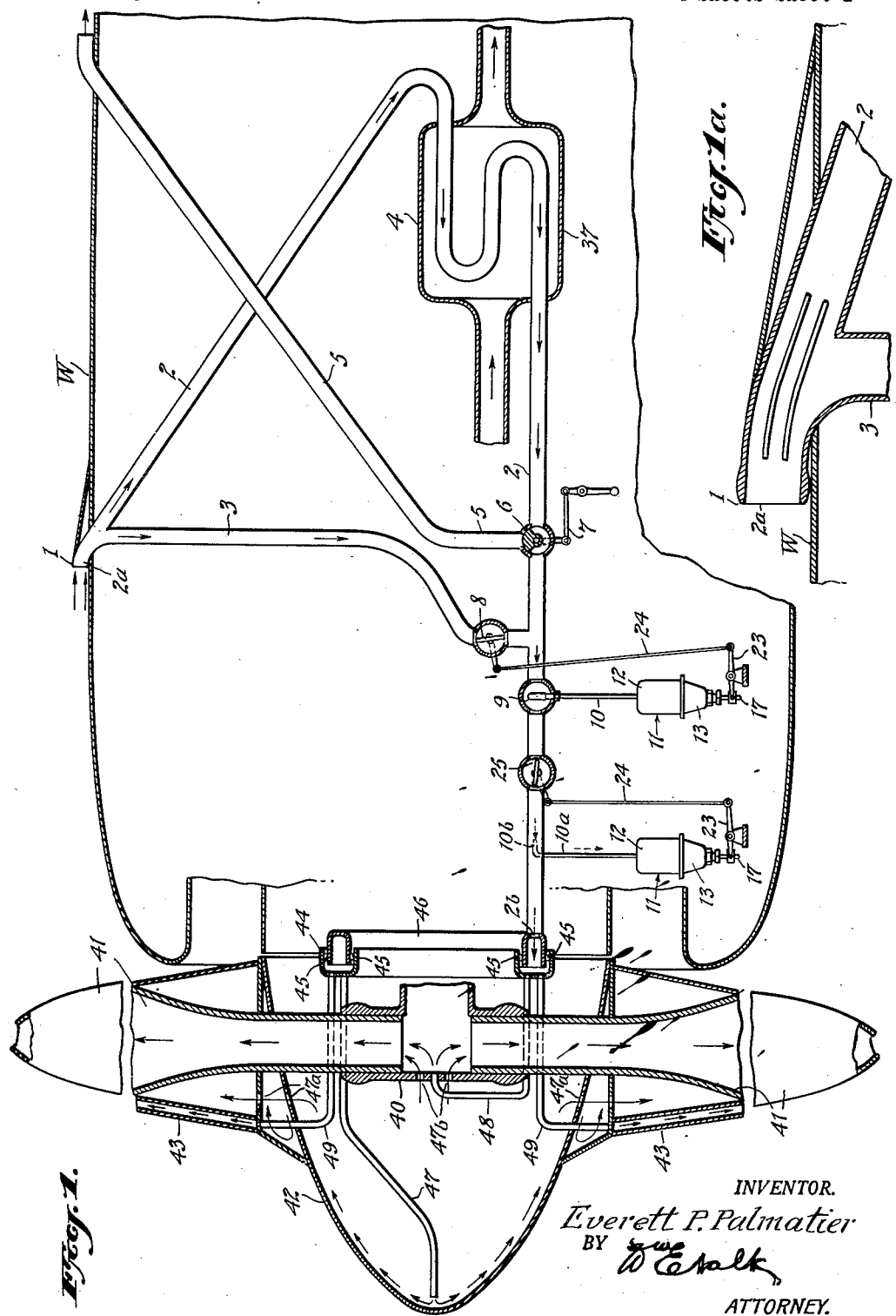
INVENTOR.
Everett P. Palmatier
BY
ATTORNEY.

May 9, 1950 E. P. PALMATIER 2,507,044
DEICING SYSTEM FOR AIRCRAFT
Filed Sept. 20, 1943 4 Sheets-Sheet 2
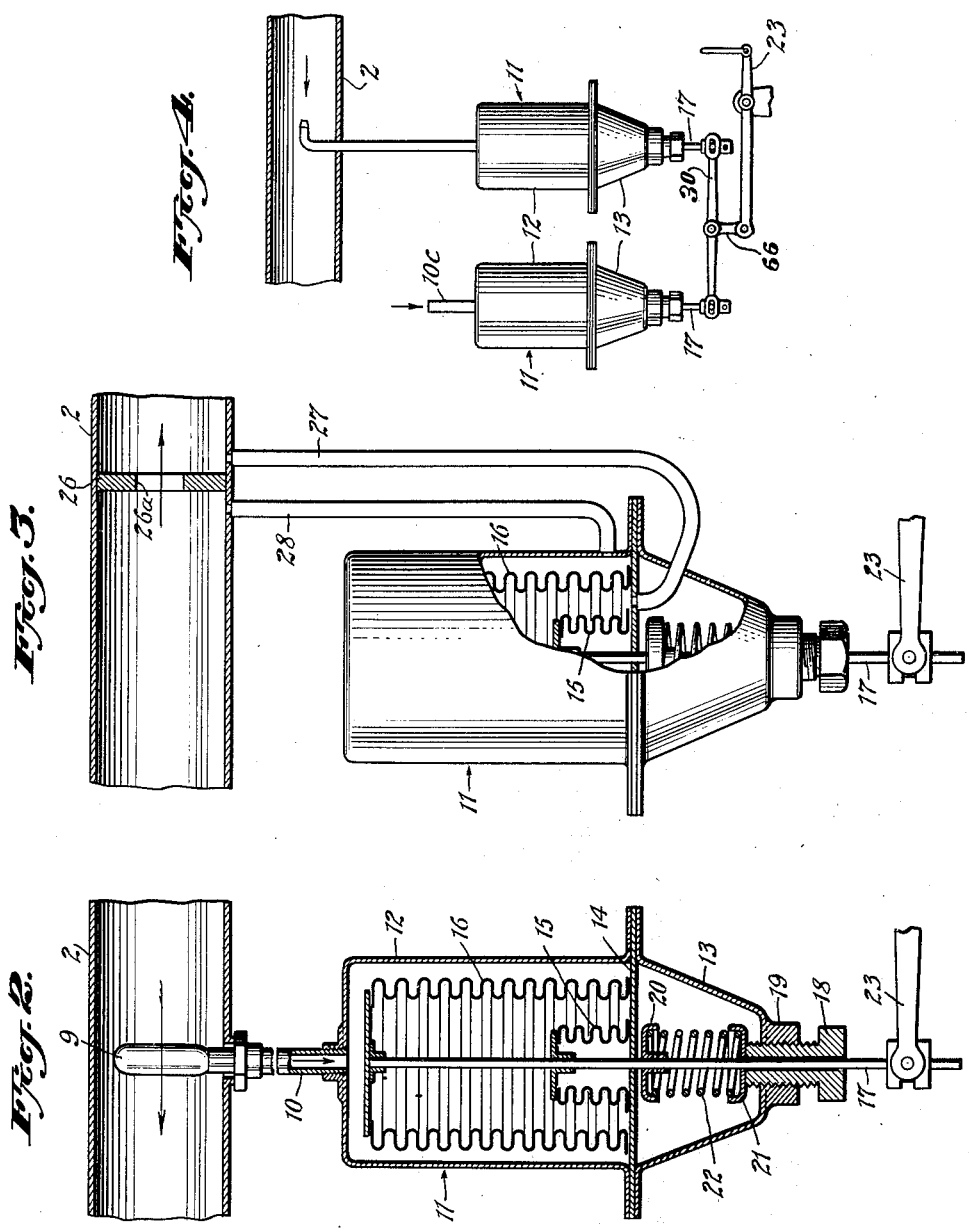
INVENTOR.
Everett P. Palmatier
BY
ATTORNEY.

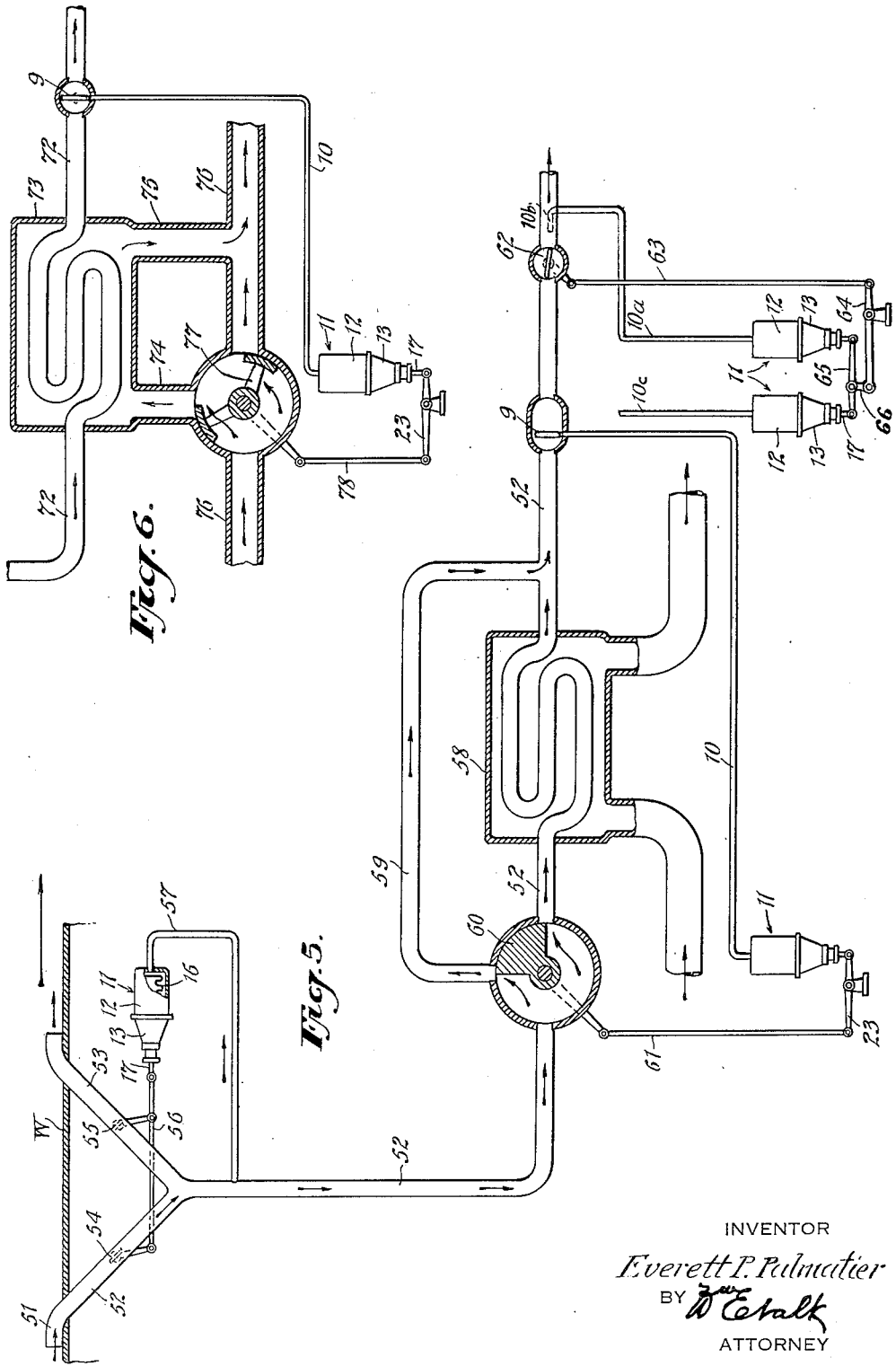

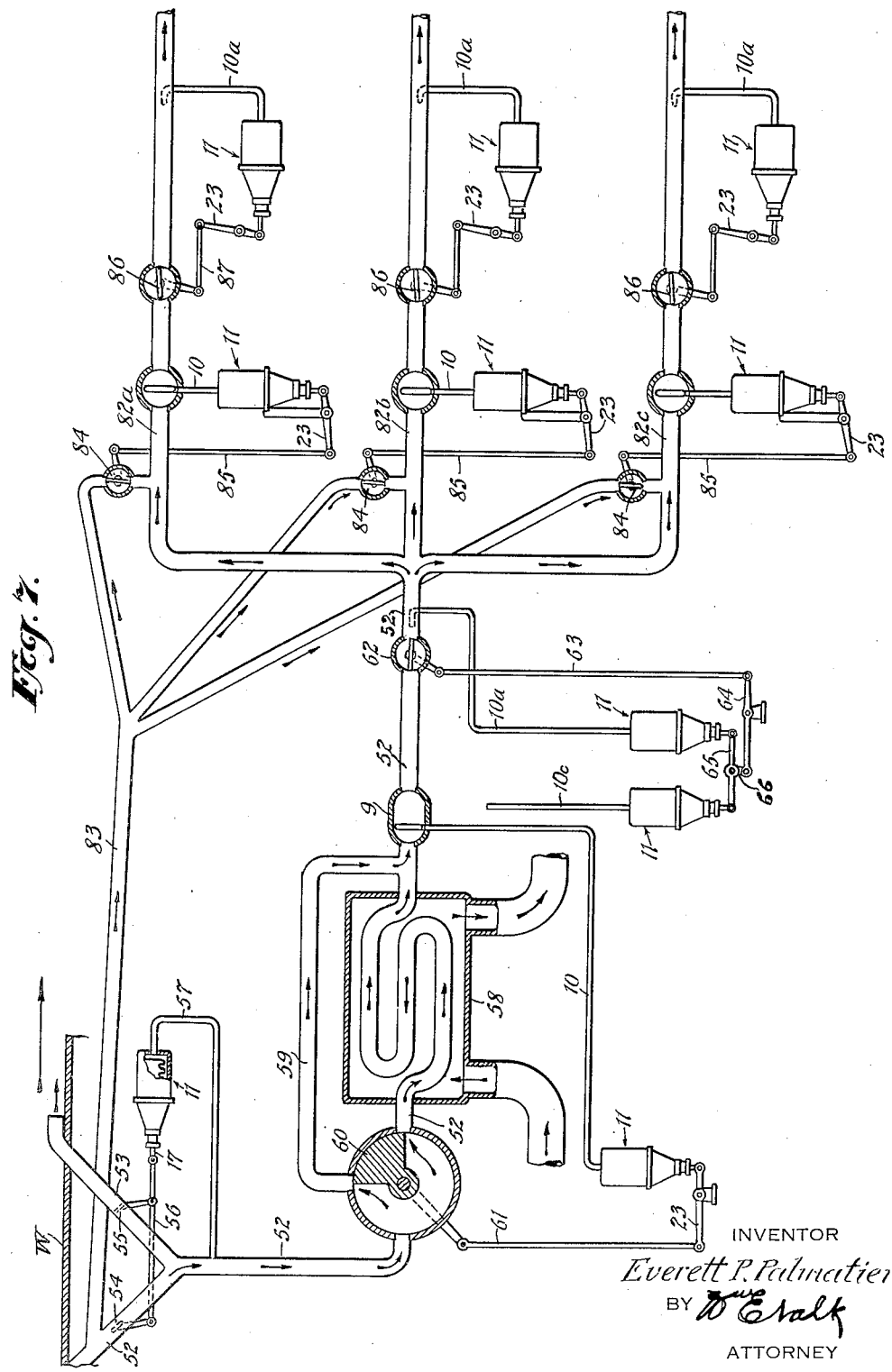

Patented May 9, 1950

2,507,044

UNITED STATES PATENT OFFICE 2,507,044

DEICING SYSTEM FOR AIRCRAFT

Everett P. Palmatier, Upper Montclair, N. J., assignor to Curtiss-Wright Corporation, a corporation of Delaware Application September 20, 1943, Serial No. 503,143

8 Claims. (Cl. 244—134)

My invention relates to aircraft de-icing systems.

My invention has particular reference to a system for directing a hot gaseous medium to an area on the aircraft to be de-iced, said system embodying one or more controls for said gaseous medium.

My invention has further reference to a novel system for supplying air which is heated in a heat-exchange zone to one or more rotatable surfaces of an aircraft to de-ice said surfaces.

My invention has further reference to arrangements for exchanging heat between a stream of air and the hot exhaust gases of an aircraft engine, means being provided for controlling the passage of air through the heat-exchange zone and/or for controlling the passage of hot exhaust gases through said zone.

Various other objects, advantages and features of my invention will become apparent from the following detailed description.

My invention resides in the art of and apparatus for de-icing aircraft surfaces, heat-exchange systems, novel control features, arrangements and combinations of the character hereinafter described and claimed.

For an understanding of my invention and for an illustration of some of the many forms thereof, reference is to be had to the accompanying drawings, in which:

Figure 1 is a schematic view showing an air heating system as constructed in accordance with the invention;

Fig. 1a is an enlarged sectional view showing a part of the apparatus illustrated in Fig. 1;

Figs. 2 and 3 are sectional views illustrating control mechanisms included in my novel heating systems;

Fig. 4 is an elevational view illustrating another control arrangement; and

Figs. 5, 6, and 7 are schematic views showing other forms of air heating systems as constructed in accordance with my invention.

Referring particularly to Fig. 1, I have shown an aircraft surface W which, for example, may be the forward surface of a wing. Projecting in the normal direction of aircraft flight is an air scoop 1 having pipes 2 and 3 branching therefrom. The air scoop 1, then, is at the inlet end 2a of the pipe 2 and it serves to establish a flow of air therethrough, this air, eventually, being discharged from said pipe 2 at the outlet end 2b thereof. As shown, the pipe 2 extends through a heating zone 4 and, beyond said zone, said pipe 2 is adapted to communicate with a pipe 5 which branches from the pipe 2 and terminates above the aforesaid surface W and facing in the opposite direction as regards the air scoop 1. Disposed at the junction of the pipes 2 and 5 is a valve 6 controlled by a device 7.

The pipe 3, as stated, communicates with the pipe 2 at the air scoop 1. The other end of said pipe 3 returns to and communicates with the pipe 2 in a section thereof beyond the zone where the pipe 5 communicates therewith. As shown, the pipe 3 has a valve 8 included therein.

Disposed in the pipe 2, beyond the section thereof with which the pipe 3 communicates, is a suitable temperature-responsive device such, for example, as a thermal bulb 9 which has communicating therewith a pipe 10 extending in sealed relation through and into the pipe 2.

The pipe 10 communicates with suitable control mechanism 11 such, for example, as illustrated in Fig. 2 as comprising a pair of housings 12, 13 secured to each other in flanged relation and separated from each other by a plate 14. Secured to the plate 14 are the inner and outer bellows 15 and 16 forming sealed chambers, respectively, and having a depending rod 17 secured to the upper plate of each, said rod 17 being slidably mounted in and with respect to the aforesaid plate 14 and also with respect to a nut 18 which is threaded through a member 19 secured to and closing the lower surface of the housing 13. Within said housing 13, the rod 17 has secured thereto a disk 20 which faces a similar disk 21 mounted on the nut 18. The rod 17 is slidable with respect to the disk 21 last named and, confined between the two disks 20 and 21, is a helical spring 22 which biases the rod 17 in an upward direction.

Referring to Fig. 2, the lower end of the rod 17 is shown as secured to one end of a suitably mounted pivoted lever 23, the other end of which is secured to the lower end of a link 24 secured, at its upper end, to the actuating handle of the aforesaid valve 8.

The aforesaid bulb 9, the pipe 10 and the space in the housing 12 between the outer bellows 16 and the interior housing surface are filled with a suitable control medium either vapor, liquid or a gas. The space within the outer bellows 16 may be sealed, evacuated or open to the atmosphere as desired. The nut 18, as will be obvious, is utilizable for adjusting the helical spring 22 to thereby vary the upward biasing effect thereof on the rod 17.

With a control mechanism of the character described, it will be understood that the temperature of the control medium in the bulb 9, as determined by the temperature of the air flowing through the pipe 2, determines the pressure of such control medium as applied to the outer bellows 16. Accordingly, the position of the coupled movable system comprising the upper plate of the bellows 16, the rod 17, lever 23, link 24 and valve 8 is dependent upon the temperature of the control medium in the bulb 9. Change in position of such movable system, for a given temperature magnitude of the air traversing the pipe 2, may be effected as desired by changing the position of the nut 18.

Referring to Fig. 1, the pipe 2, beyond the aforesaid bulb 9, is shown as having included therein a valve 25, the position of which, in accordance with the invention, is rendered dependent upon the quantity (pounds) of air passing, per unit of time, through said pipe 2 beyond said valve 25. Any suitable mechanism may be utilized for controlling the position of the valve 25 and, for purposes of explanation of the invention, I have illustrated the quantity control mechanism for the valve 25 as being a duplicate of that used with the bulb 9, the same reference characters being applied, respectively, to duplicate parts. As will be noted, the pipe 10a of the quantity control mechanism 11 comprises an angular inlet section 10b extending longitudinally along the pipe 2, the open end thereof facing the oncoming air stream. The pipe 10a communicates with the space in the associated housing 12 between the outer bellows 16 and the interior housing surface. It will be understood that, dependent upon the position of the nut 18 of the quantity control mechanism, the valve 25 takes a position such that a desired quantity of air passes therethrough per unit of time.

In lieu of the pipe 10a, 10b of the quantity control mechanism 11 as described, I may utilize the arrangement shown in Fig. 3 wherein a plate 26 having a central orifice 26a is disposed transversely in the pipe 2. Opening into the pipe 2 at opposite sides of the plate 26 and closely adjacent thereto are the respective pipes 27, 28. The pipe 27 communicates with the interior chamber of the bellows 16 whereas the pipe 28 communicates with the chamber formed by the exterior surface of the bellows 16 and the interior surface of the housing 12. With the arrangement of Fig. 3, the same as with the quantity control mechanism previously described, the position of the rod 17 is dependent upon the quantity of air passing, per unit of time, through the pipe 2 beyond the valve 25.

Under some circumstances, it may be desirable to compensate either or both of the aforesaid control mechanisms for changes in altitude of the aircraft. To this end and as illustrated in Fig. 4, the movable rod 17 of one control mechanism 11, may have one end of a lever 30 pivoted thereto, the other end of said lever 30 being pivoted to the lower end of the movable rod 17 of another control mechanism 11 comprising a pipe 10c which is open to the atmosphere. Accordingly, the exterior surface of the bellows 16 of said last named control mechanism is subjected to atmospheric pressure as existing at a given altitude and, therefore, the force exerted on the last named rod 17 is dependent upon the magnitude of such atmospheric pressure providing that the bellows 16 is sealed and evacuated or sealed and containing a quantity of air or other gas. Further, force exerted on said last named rod 17 changes in accordance with change of atmospheric pressure as the altitude of the aircraft changes. Through the lever 30, the two rods 17 are interconnected as shown in Fig. 4, the resultant control effect being imposed on the control lever 23.

The heating zone 4 hereinbefore referred to may be constituted by such suitable heating apparatus as may be desirable. To this end, for example, a suitable liquid fuel burner may be utilized for heating the air passing through the pipe 2. Preferably, however, and as shown, the heating zone 4 is constituted by any suitable heat-exchange device which is diagrammatically shown as comprising a housing 31 having inlet and outlet ports traversed by the hot exhaust gases from the aircraft engine, convolutions of the pipe 2 being suitably arranged in said housing 31.

In normal operation, the valve 6 is so positioned that the pipe 5 is in non-communicating relation with the pipe 2. During flight of the aircraft, the air scoop 1 continuously supplies air to the inlet end 2a of the pipe 2 and also to the inlet end of the pipe 3. As a result, air passes continuously through the pipe 2 to the outlet end 2b thereof and, while passing through the heating zone 4, the temperature of the air is elevated by heat obtained from the exhaust gases.

The valve 8 is normally partially or entirely closed, but in the event that the air passing through the pipe 2 becomes warmer than desired, the temperature-responsive control mechanism 11 is actuated by the thermal bulb 9 to produce upward movement of the link 24 whereby the valve 8 is opened sufficiently to permit the proper quantity of cool air to flow from pipe 3 to pipe 2 to reduce the temperature of the heated air therein to the desired point.

In the event that the quantity of air traversing the pipe 2 is larger than desired, the air pressure in the pipe 10a increases to thereby actuate the quantity control mechanism 11 to effect upward movement of the link 24 whereby, as a result, the valve 25 which is normally partially open is moved toward a closed position.

As will be understood from the preceding description, either or both of the control mechanisms 11 may be operated, as shown in Fig. 4, in combination with a supplementary device whereby compensation is effected for change in aircraft elevation.

In view of the foregoing description, it will be understood that, with the system of my invention, a stream of air passes continuously through the pipe 2 and emerges from the outlet end 2b thereof. The thermal bulb 9, by its action on the control mechanism 11 associated therewith, causes this air stream to have a desired temperature. The air pressure in the pipe 10a, by the action thereof on the quantity control mechanism 11, causes the desired quantity of air to pass through the pipe 2 per unit of time.

In the event that the heat-exchange device hereinbefore described becomes unduly heated, the valve 6 may be operated to close off that section of the pipe 2 to the left thereof, Fig. 1, and to open communication of the pipe 5 with that section of said pipe 2 at the right of the valve 6. As a result, there is an increased flow of cold air through the heat exchange device by way of the pipes 2 and 5 whereby the temperature of said heat exchange device is lowered.

From the foregoing description, it will be understood that the flow of air through the pipe 2 is established and maintained in response to movement of the aircraft through the air. Obviously, a pump, or equivalent, may be utilized for effecting such passage of air through the pipe 2 and, if desired, it will be understood that the pump may be utilized booster-fashion to increase the flow of air through said pipe 2.

The heated air emerging from the outlet end of the pipe 2 may be utilized for any suitable purpose as desired. For example, this stream of heated air may be utilized to heat any selected air craft surface to prevent the formation of ice thereon or to melt ice which has already been formed thereon.

As illustrative of some uses of the stream of heated air, reference is to be had to Fig. 1 which, in a diagrammatic manner, shows a propeller hub 40 having angularly related sockets for the reception of the respective propeller blades 41. Associated with the hub 40 is a spinner 42 and, exteriorly thereof, cuffs 43 are disposed around the respective blades 41. The parts thus described are rotatable together as a unit. Suitably secured to these rotatable parts is an annular housing 44 maintained in sealed relation as at 45 with a second annular housing 46 suitably secured in fixed position with respect to the rotatable housing 44.

As shown, the outlet end 2b of the pipe 2 communicates with and discharges a main stream of heated air into the sealed chamber defined by the housings 44 and 46. Secured to the housing 44 for rotatable movement therewith and communicating with said chamber are four pipes 47, 48 and 49, 49 traversed, respectively, by secondary streams of heated air. The pipe 47 passes heated air into the spinner 42 and, particularly, into engagement with the interior surface of said spinner 42 from which such heated air may pass into heat-transferring relation with the blade cuffs 43 by way of the respective passages 47a and, further, heated air from the spinner 42 may pass into the hollow blades 41 by way of passages 47b. The pipe 48 terminates interiorly of the hub 40 and conveys heated air into the space defined thereby, such heated air thereafter passing outwardly into and through the interior chambers defined by the respective propeller blades 41 each of which comprises an air-discharge passage at or near the end thereof. The pipes 49 are bent angularly and communicate with the respective chambers formed at the leading edges of the cuffs 43, to which they convey heated air from the chamber 45—46.

Referring to Fig. 5, the aircraft surface W is shown as supporting an air scoop 51 adapted to supply air to a pipe 52 which corresponds with the hereinbefore described pipe 2. Branching from the pipe 52 is an upwardly extending pipe 53 which terminates above the surface W at the rear of the air scoop 51. Disposed in the pipes 52 and 53 are the respective valves 54 and 55 which are operated by control mechanism 11 of the character shown in Fig. 2, the rod 17 of said control mechanism 11 having connected thereto a member 56 to which each of the valves 54 and 55 is connected. Communicating with the chamber defined by the exterior surface of the bellows 16 and the interior surface of the housing 12, Fig. 5, is a pipe 57 which communicates with the aforesaid pipe 52 beyond the junction thereof with the pipe 53. Accordingly, the valves 54 and 55 are responsive to the intake pressure of the air passing through the pipe 52.

The pipe 52 extends through a suitable heating zone exemplified by a housing 58 having inlet and outlet ports traversed by the hot exhaust gases from the aircraft engine, convolutions of the pipe 52 being suitably arranged in said housing 58.

A pipe 59 communicates with the pipe 52 adjacent the entrance side of the heat-exchange zone. This pipe 59 by-passes said heat-exchange zone and is disposed in communicating relation with the pipe 52 adjacent the exit side of the heat-exchange zone. Disposed at the junction of the pipes 52 and 59, at the entrance side of the heat-exchange zone, is a valve 60 adapted to be actuated by a link 61 pivoted to the lever 23 of a control mechanism 11 which is a duplicate of the control mechanism illustrated in Fig. 2. Accordingly, said control mechanism 11 of Fig. 5 has extending therefrom a pipe 10 which terminates in a thermal bulb 9 disposed in the pipe 52 beyond the junction thereof with the discharge end of the pipe 59, the bulb 9, pipe 10 and the space in the housing 12 exteriorly of the outer bellows 16 of the last named control mechanism 11 being filled with a suitable control medium, for example, as hereinbefore described.

The pipe 52, adjacent the discharge end thereof, has disposed therein a valve 62 which is controlled primarily by the quantity of air traversing the pipe 52 and by the ambient pressure of such air. Accordingly, the valve 62 has connected thereto a link 63 which is pivoted to a suitably supported lever 64 controlled by a pair of control mechanisms 11 of the character illustrated in Fig. 2. The pipe 10a of one of these control mechanisms 11 terminates in an angular section 10b disposed in a section of the pipe 52 beyond the junction thereof with the discharge end of the pipe 59, this angular pipe section 10b facing the stream of oncoming air downstream of the valve 62, said pipe 10a communicating with the chamber defined by the exterior surface of the bellows 16 and the interior surface of the housing 12. Hence, the rod 17 of said last named control mechanism varies in position in accordance with the quantity of air passing through the pipe 52. The pipe 10c of the other control mechanism is open to the ambient air as shown in Fig. 4. Hence, the rod 17 of the control mechanism last named varies in position in accordance with the temperature of the air passing through said last named section of the pipe 52.

The rods 17 of the aforesaid pair of control mechanisms 11 are pivoted, respectively, to the opposite ends of a lever 65 which, by a link 66, is pivoted to the aforesaid lever 64. Accordingly, the lever 64, link 63 and valve 62 take a position which is dependent jointly upon the ambient pressure and the quantity of air passing through a section of the pipe 52 beyond the junction thereof with the aforesaid pipe 59. The elements 64 and 65 are like the elements 23 and 30, respectively, shown in Fig. 4.

As regards the form of my invention disclosed in Fig. 5, the control mechanism 11 for the valves 54 and 55 holds these valves in such respective positions that the intake pressure of the air passing through the pipe 52 beyond the junction thereof with the pipe 53 has a desired value. In case this intake pressure becomes too high, said control mechanism last named operates to move the valve 54 to a more closed position and the valve 55 to a more open position. Should such intake pressure become too low, an operation the reverse of that described is effected on the valves 54 and 55.

The control mechanism 11 for the valve 60 is operated in accordance with the temperature of the air passing through that section of the pipe 52 beyond the heat-exchange zone. In case the temperature of the air passing through said last named pipe section becomes too high, the control mechanism 11 moves the valve 60 to such position that more of the air by-passes the heat-exchange zone by way of the pipe 59. Should the temperature of the air in said last named pipe section become too low, an operation is performed the reverse of that described whereby the pipe 59 is throttled to cause more air to pass through the heat-exchange zone.

As hereinbefore stated, the position of the valve 62 is determined jointly by the quantity of air passing through that section of the pipe 52 beyond the junction thereof with the pipe 59 and also by the altitude or ambient pressure.

Referring to Fig. 6, I have shown a pipe 72 which is traversed by air in the manner hereinbefore described with respect to the pipes 2 and 52. The pipe 72 extends through a suitable heating zone exemplified by a housing 73 having an inlet port 74 and an outlet port 75. A pipe 76 traversed, for example, by the hot exhaust gases from the aircraft engine communicates with both of the ports 74 and 75. Disposed at the junction of the pipe 76 and the inlet port 74 is a valve 77 adapted to be actuated by a link 78 pivoted to the lever 23 of a control mechanism 11 which is a duplicate of the control mechanism illustrated in Fig. 2. Accordingly, said control mechanism 11 of Fig. 6 has extending therefrom a pipe 10 which terminates in a thermal bulb 9 disposed in the pipe 72 beyond the heat-exchange zone, the bulb 9, pipe 10 and the space in the housing 12 exteriorly of the outer bellows 16 of the control mechanism 11 illustrated in Fig. 6 being filled with a suitable control medium, for example, as hereinbefore described.

As regards the form of my invention shown in Fig. 6, it will be understood that the control mechanism 11 thereof is responsive to the temperature of the air passing through that section of the pipe 72 beyond the heat-exchange zone. Accordingly, when the temperature of the air in said section of the pipe 72 becomes too high, the valve 77 is moved clockwise to throttle the inlet port 74 and open the adjacent exit port of the pipe 76 to thereby decrease the quantity of hot gases passing through the heat-exchange zone. As will be obvious, this decreases the temperature of the air passing through the pipe 72. Should the temperature of the air passing through said section of the pipe 72 become too low, an operation the reverse of that described is effected whereby a larger stream of hot gases pass through the heat-exchange zone.

In the form of my invention shown in Fig. 7, a stream of hot air is obtained at the discharge end of the pipe 52 in the same manner as hereinbefore described with respect to the form of the invention shown in Fig. 5, and, as shown, the pipe 52 supplies heated air to a plurality of pipes 82a, 82b and 82c.

The hereinbefore described pipe 52, between the valve 54 and the air scoop 51 has connected thereto a pipe 83 which terminates in branches communicating with the respective pipes 82a, 82b and 82c. Each branch of the pipe 83 has disposed therein a valve 84 which, by a link 85, is connected to the lever 23 of a control mechanism 11 which may be a duplicate of the control mechanism illustrated in Fig. 2. Hence, the pipe 10 of each link-actuating control mechanism 11 terminates in a bulb 9, these bulbs 9 being disposed in the respective pipes 82a, 82b and 82c and the space within the bulb 9, pipe 10 and the housing 12 exteriorly of the outer bellows 16 of each control mechanism 11 last named being filled with a suitable control medium such, for example, as hereinbefore described.

Each of the aforesaid pipes 82a, 82b and 82c, in the section thereof beyond the bulb 9, has included therein a valve 86 which, by a link 87, is connected to the lever 23 of a control mechanism 11 of the character hereinbefore described, the angular open end of each pipe 10a for each control mechanism 11 last described facing the oncoming stream of heated air in each of the pipes 82a, 82b and 82c beyond the respective valves 86.

As regards the pipe 82a of Fig. 7, for example, it will be understood that, should the air traversing the same become too hot, the lever 23 of the control mechanism 11 toward the left moves the link 85 upwardly to thereby move the valve 84 a more open position. In so doing, cool air is admitted to the pipe 82a by way of the pipe 83 and, therefore, the temperature of the heated air in said pipe 82a is lowered.

Should the quantity of air traversing the pipe 82a last named be too large, the control mechanism 11 toward the right swings the lever 23 in a clockwise direction whereby the link 87 is moved from left to right to thereby move the valve 86 to a more closed position.

It will be understood, in view of the foregoing description, that the streams of heated air traversing the respective pipes 82b, 82c are controllable, as regards temperature and quantity, by the various control mechanisms 11 in the same manner as described above with respect to the pipe 82a.

As regards the forms of my invention illustrated in Figs. 5, 6 and 7, it will be understood that the heated air issuing from the pipes 52, 72, 82a, 82b and 82c may be utilized, for example, in the general manner illustrated in Fig. 1 with respect to the pipe 2 for heating the illustrated aircraft surfaces for de-icing purposes. Obviously, from some aspects, the invention is not to be limited to the de-icing of rotatable aircraft surfaces as illustrated in Fig. 1 since, within a broad scope of the invention, the heated air produced in any of my novel systems may be utilized as desired for de-icing any selected aircraft surfaces whether it is a rotatable surface or a fixed surface such as a wing, for example.

With reference to Fig. 4, I have illustrated an arrangement wherein the quantity of air traversing the pipe 2 is compensated for change in altitude of the aircraft and I have stated that similar compensation may be effected for a control mechanism which is responsive to the temperature of the air traversing said pipe 2. In Fig. 5, I have illustrated two associated control mechanisms 11, the one at the right being responsive to the quantity of air traversing the pipe 52 and the one at the left compensating the quantity control mechanism for change in altitude or ambient pressure.

In view of the foregoing description, it will be understood that my invention relates to the heat-exchange systems for heating air which, subsequently, is utilizable for de-icing aircraft surfaces. These systems may include one or more of the control mechanisms hereinbefore described. As regards the control features of my invention, however, it is to be understood that, in certain broad aspects of the invention, they may be utilized for varying the temperature, quantity, etc. of the heated gaseous medium irrespective of its quality (whether ordinary air, exhaust gases or the like) and the particular manner in which the same was heated. Thus, for example, it will be understood that one or more of the control mechanisms 11 may be utilized for effecting controls on the hot exhaust gases themselves provided that it becomes desirable to use them for de-icing purposes. In the appended claims, then, the expression "gaseous medium" shall be understood as generically including ordinary air such as flows through the air scoop 1 and exhaust or other hot gases.

In the appended claims, the expression "de-icing" shall be understood as describing true de-icing wherein that ice is melted which, previously, had been formed on the aircraft surfaces and said expression shall also be considered as describing an operation wherein the aircraft surfaces are subjected to the action of heated air to positively prevent formation of ice thereon.

In the appended claims, the references to a "condition" of heated air, the hot gases or the hot gaseous medium shall be understood as descriptive of conditions such as temperature, quantity or other characteristics of the air, gases, or gaseous medium. Further, the references in the appended claims to a "control" which is effective on the stream of air shall be understood as descriptive of the operations performed by any one of the control mechanisms 11.

While the invention has been described with respect to certain particular preferred examples which give satisfactory results, it will be understood of those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In an aircraft propeller anti-icing system, a propeller including hollow blades communicating with a hollow hub, hollow cuffs around the blade shanks and a hollow spinner, a transfer annulus comprising a part rotatable with the propeller and a stationary part, separate air ducts leading from said rotatable part to the hollows of the spinner, the cuffs and the propeller hub for passage of air therethrough into said blades, means to vent said spinner, cuffs and blades for outflow of air fed thereto, a warm air supply pipe leading to said stationary part of the transfer annulus, and means to supply warm air to said pipe at a controlled temperature.

2. In an aircraft propeller anti-icing system, a propeller including hollow blades communicating with a hollow hub, hollow cuffs around the blade shanks and a hollow spinner, a transfer annulus comprising a part rotatable with the propeller and a stationary part, separate air ducts leading from said rotatable part to the hollows of the spinner, the cuffs and the propeller hub for passage of air therethrough into said blades, means to vent said spinner, cuffs and blades for outflow of air fed thereto, a warm air supply pipe leading to said stationary part of the transfer annulus, supply means comprising an ambient air intake, a heat transfer unit receiving air from said intake and delivering hot air, and means to dilute said hot air with ambient air to provide warm air to said supply pipe at a controlled temperature.

3. In combination, a rotating propeller system including a hollow spinner, a hollow propeller blade and a hollow cuff secured to and embracing said blade, said blade and cuff each having an inlet opening at the inner end thereof and a vent adjacent the outer end thereof, said spinner having an inlet duct opening adjacent the nose thereof and having an outlet remote from said inlet duct opening, a hot gas manifold on the propeller, means to feed hot gas thereto, and feed connections from said manifold to each of said blade and cuff inlet openings and to said spinner inlet duct opening, said hot gas passing through said blade, cuff and spinner in separate streams for discharge to the atmosphere from respective vents and outlet openings.

4. In combination with an aircraft propeller having a hollow hub embracing spinner, and having blades provided with hollow shank embracing cuffs, means to pass hot gas into said spinner adjacent its nose, means to lead hot gas from said spinner into said blade cuffs, and exit means in said cuffs for outflow of hot gas therefrom, said hot gas being so directed into said spinner and cuffs as to contact the surfaces thereof for heat transfer thereto.

5. In an aircraft propeller comprising a hub, hollow blades secured therein and extending therefrom, and a hollow spinner embracing said hub and extending over the upstream portion thereof, said blades and spinner all being susceptible to ice accretion under certain flight conditions, a unified de-icing system comprising a hot gas receiving manifold downstream of the propeller embracing the propeller hub, means to feed hot gas to said manifold, and ducts leading from said manifold, longitudinally of said hub between said blades and opening into the hollow of said spinner and into the hollows of said blades to feed hot gas thereto.

6. In an aircraft propeller comprising a driven hub having blade sockets, hollow blades secured in said sockets said blades being open at their butts, and said hub at one end thereof having an open hollow central portion in free communication with said blade hollows, a hot gas receiving manifold embracing said hub on the opposite end of said hub from said hub hollow, means to feed hot gas to said manifold, and hot gas passages leading from said manifold longitudinally of said hub and opening to said hub hollow to conduct hot gas from said manifold to said hub hollow and said blade hollows.

7. In an aircraft propeller comprising a driven hub having blade sockets, hollow metal blades secured in said sockets said blades being open at their butts, said hub having a central hollow zone in free communication through said butt openings with said blade hollows, a hollow spinner embracing said hub and covering one end thereof, the spinner hollow having communication with the hub and blade hollows, and means for feeding hot gas to said spinner hollow for flow therethrough and thence into said hub hollow and said blade hollows.

8. In an aircraft propeller system, a hub having blade sockets and having a substantially central opening in its one end, a manifold for hot gas on the hub toward its other end, means to feed hot gas to said manifold, hollow blades secured in said sockets each having an opening in its butt to establish free passages from said hub opening to said blades, and a duct for hot gas leading from said manifold and between adjacent blade sockets, exteriorly of said hub, to said hub opening.

EVERETT P. PALMATIER.

REFERENCES CITED

The following references are of record in the file of this patent:

UNITED STATES PATENTS

| Number | Name | Date |
|---|---|---|
| 1,696,214 | Snell | Dec. 25, 1928 |
| 1,742,938 | Schumann | Jan. 7, 1930 |
| 1,827,276 | Alfaro | Oct. 13, 1931 |
| 1,879,717 | Sikorsky | Sept. 27, 1932 |
| 1,899,689 | Houston | Feb. 28, 1933 |
| 1,932,681 | Smith | Oct. 31, 1933 |
| 1,966,522 | Roggenbaur | July 17, 1934 |
| 2,046,521 | Mahaffey | July 7, 1936 |
| 2,087,171 | Szostek | July 13, 1937 |
| 2,156,103 | Austin | Apr. 25, 1939 |
| 2,285,071 | Wolff | June 2, 1942 |
| 2,289,400 | Woods | July 12, 1942 |
| 2,310,941 | Dewey | Feb. 16, 1943 |
| 2,318,233 | Keller | May 4, 1943 |
| 2,364,458 | McCollum | Dec. 5, 1944 |

FOREIGN PATENTS

| Number | Country | Date |
|---|---|---|
| 486,549 | Great Britain | June 7, 1938 |
| 495,047 | Great Britain | Nov. 7, 1938 |
| 504,737 | Great Britain | May 1, 1939 |
| 506,444 | Great Britain | May 30, 1939 |
| 523,803 | Great Britain | July 23, 1940 |
| 376,511 | Italy | Nov. 16, 1939 |
| 837,466 | France | Nov. 12, 1938 |